No. 866,294. PATENTED SEPT. 17, 1907.
W. J. MILLER.
MOTOR VEHICLE.
APPLICATION FILED JAN. 23, 1907.

2 SHEETS—SHEET 1.

WITNESSES:

William J. Miller INVENTOR.

BY
ATTORNEY.

William J. Miller INVENTOR.

UNITED STATES PATENT OFFICE.

WILLIAM J. MILLER, OF COLUMBUS, OHIO, ASSIGNOR TO THE OSCAR LEAR AUTOMOBILE COMPANY, OF COLUMBUS, OHIO, A CORPORATION OF OHIO.

MOTOR-VEHICLE.

No. 866,294.　　　　Specification of Letters Patent.　　　　Patented Sept. 17, 1907.

Application filed January 23, 1907. Serial No. 353,729.

*To all whom it may concern:*

Be it known that WILLIAM J. MILLER, a citizen of the United States, residing at Columbus, in the county of Franklin, State of Ohio, has invented certain new and useful Improvements in Motor-Vehicles, of which the following is a specification.

My invention relates to improvements in motor vehicles, and contemplates the mounting of a cab body upon the under frame construction of a motor vehicle, said cab body being provided with an extension preferably on the rear side thereof, said extension being provided with a platform at the top thereof and a seat elevated upon the rear of said platform, so that the driver when seated may look over the top of the cab body in the direction in which the vehicle is moving; it comprises further the mounting upon the platform and at the rear of the cab body within easy reach of the driver when seated, the levers and other devices used in controlling the engine, the speed, the brakes, the fuel supply, and all the other connections which must be under the control of the operator for successful manipulation of a motor vehicle; it comprises further the parts and combinations of parts necessary to effect the foregoing purposes, which will be more particularly hereinafter described and embodied in the claims.

Figure 1:
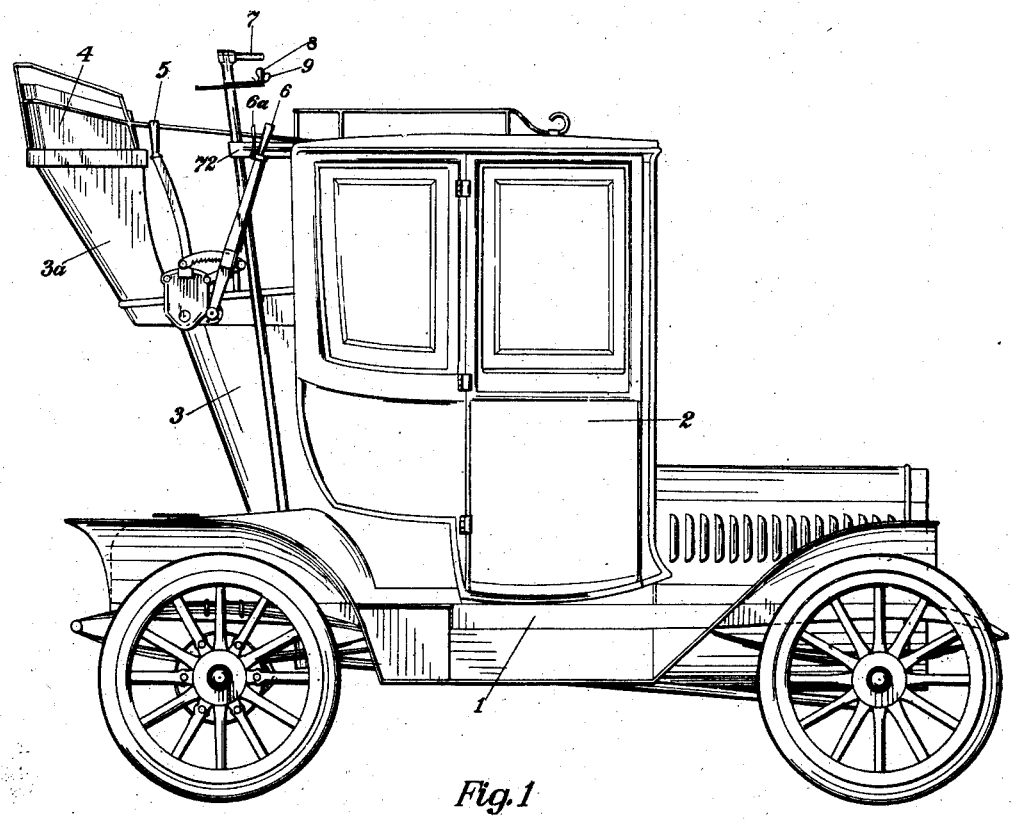
Figure 2:
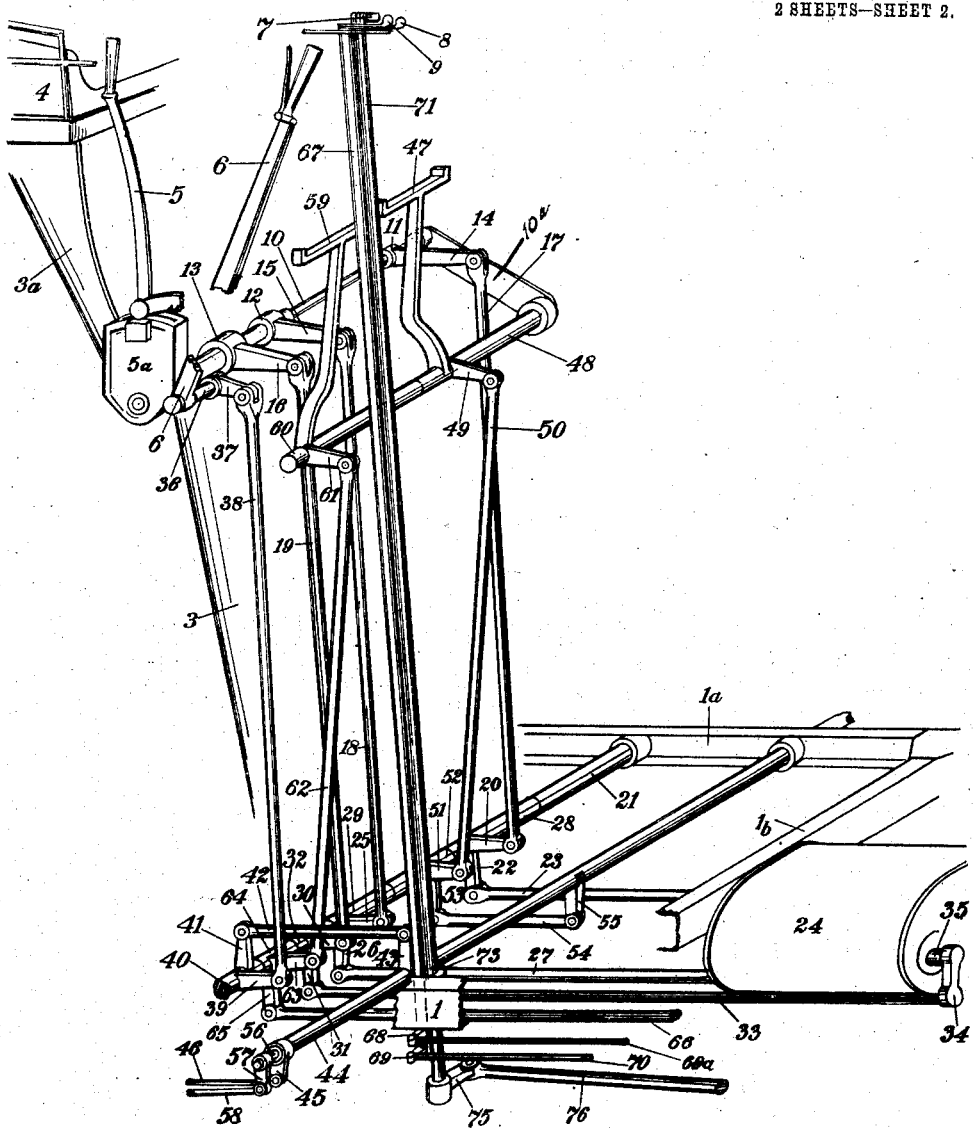

Referring to the drawings which are hereto attached and hereby made a part of this specification, Figure 1 is a side view of a motor vehicle provided with the cab body and the rear platform and elevated seat and the means for manipulating the parts which control the operation of the vehicle; Fig. 2 is a view from above and somewhat to one side of the means for controlling the operation of the vehicle, and the manner of mounting the same, the underframe construction and the cab body being almost entirely omitted.

In the drawings, in which the same numerals indicate identical parts throughout, 1 is the frame of the vehicle upon which practically midway between the forward and rear wheels is mounted the cab body 2, having the rear extension 3 with the platform at the upper side thereof; rising from the rear of the platform on this extension is the supporting structure 3ª for the seat 4. When the driver is seated thereon he may look over the vehicle in the direction of its movement and control it in such manner as to avoid all obstructions and collisions.

5 is the shifting lever which controls the change speed mechanism, the said lever being arranged in the box 5ª, and adapted to be shifted vertically, laterally, forwardly, and rearwardly, as shown in the Frayer and Miller application, Serial No. 309,968, filed April 5, 1906, which construction need not therefore be further described in this application.

Under control of the lever 5 is the shaft 10, journaled at one end in the box 5ª, and at its other end in the plate 10ª which is secured to the side of the extension 3 in a manner not shown herein; in one of its positions, the lever 5 is adapted to actuate the shaft 10. Mounted thereon at 11 is a rocker arm 14 movable with the shaft, which is pivotally connected with the vertical rod 17; the rod 17 at its lower end is connected with one arm 20 of a bell crank, mounted upon the sleeve 28 carried by the shaft 21. Said shaft is mounted at one end in the side frame 1ª and at its opposite end in the side frame 1, which latter is broken away. The other arm 22 of the bell crank extends downwardly and has pivotally connected therewith the rod 23, the latter passing thence to the transmission box shown conventionally at 24. Therefore if the lever 5 be connected with the shaft 10 and rocked, it will, through the connections described, operate to produce a certain position of the gearing in the transmission box, and thereby affect the speed or the direction of the vehicle depending upon which position is created by the rotation of the shaft 10; this is not a feature of the present invention and it need not therefore be specifically stated just what effect the rotation of said shaft may produce, it being sufficient for the present purpose to state that connection therethrough is had with the transmission gearing. Lever 5 is also adapted to be thrown into engagement with the sleeve shown at 12 on shaft 10 and thereby rock the arm 15 which is pivotally connected with the rod 18, the latter at its lower end connecting with the arm 25 of the bell crank mounted upon the sleeve 29 on shaft 21, the other arm of the bell crank 26 being pivotally connected with the rod 27 which passes into the transmission box 24 and operates to effect a shift in the gearing therein. Lever 5 is also adapted to be thrown into engagement with the sleeve 13 mounted upon the shaft 10, rocker arm 16 being mounted upon said sleeve 13 to turn therewith; said rocker arm is pivotally connected with the vertical rod 19 which at its lower end is pivotally secured to the arm 30 of the bell crank mounted upon the sleeve 32 on the shaft 21. The other arm 31 of said bell crank being pivotally attached to the rod 33, is connected at its outer end with crank 34 to actuate crank 35, which operates within the transmission box to effect the enmeshing of desired gearing. It will be understood that each of the rods passing to the transmission box operates to produce an effect different from that of each of the other rods. But, as stated, it is unnecessary for the present purposes to indicate the specific effect produced by the actuation of each rod.

Mounted upon the lower outer edge of the box 5ª is the short shaft 36 which is under control of the lever 6, shown partly broken away; when the shaft 36 is actuated by the lever 6, rocker arm 37 mounted thereon will be moved vertically. To the latter is pivoted one end of the vertical rod 38, the other end being pivotally connected with the rocker arm 39 mounted upon the shaft 40 to turn the same. Rocker arm 41 is rigidly connected with the section 40 of the shaft 41 and the actuation of rocker arm 39 sets up motion in the rocker arm 41 which actuates the link 42 connected therewith at one end, and at its other end being pivotally connected with the rocker arm 43, the latter being mounted upon the sleeve 44 on the shaft 56; rocker arm 45 is rigidly mounted upon said sleeve 44 to be actuated thereby and is pivotally connected with the rod 46, which passes to one of the brakes, not shown. 47 is a lever adapted to be operated by a foot of the driver, and is rigidly mounted upon the shaft 48 which is journaled at one end in the plate 10ᵃ and at its other end to the rearward extension 3, the point not being shown herein. Rocker arm 49 is mounted upon the shaft 48 and adapted to be actuated by the movement of the lever 47, and is pivotally connected with the rod 50; the latter at its lower end is pivotally connected to the arm 51 of the bell crank mounted upon the sleeve 52 on shaft 21, the other arm 53 of said bell crank being pivotally connected to the link 54, the latter being connected with the rocker arm 55 mounted rigidly on shaft 56, and adapted to actuate rocker arm 57 mounted upon the outer end of shaft 56, and in turn actuate rod 58 which controls the brake (not shown).

59 is a foot lever mounted upon shaft 60 and therethrough adapted to actuate rocker arm 61, the latter being pivotally connected to the vertical rod 62 which at its lower end engages pivotally with arm 63 of the bell crank mounted upon the sleeve 64 on shaft 21, arm 65 of said bell crank being connected with rod 66 which controls the engine clutch (not shown).

The lever or steering head 7 passes downwardly through the tube 71 mounted near its upper end in strap 72 extending from the upper side of the cab body and adjacent its lower end in the main frame 1, and has at its lower end the rocker arm 75 connecting with the rod 76 which passes to the steering connections on the front axle (not shown). The levers 8 and 9 actuate rods inclosed in the tube 67 and having secured at their lower ends respectively the rocker arms 68 and 69, 68 being connected with the rod 68ᵃ which is adapted to control the ignition devices (not shown), the rocker arm 69 having connected therewith the rod 70 which regulates the mixture of air with the fuel.

The foregoing description, in connection with the drawings shows that I have devised effective means for controlling the operation of a motor vehicle from a lofty seat in the rear thereof, and have provided an extension upon the body of said vehicle for the mounting and the housing of the shafts, rocker arms, rods and levers essential in operating the vehicle from the elevated platform. It will be seen therefore that the extension 3 has two very important functions, the one being to support the platform and the elevated seat at the top thereof, the other being to provide a housing for the means for operating the vehicle.

I do not know that any inventor has hitherto taken up the means of mounting and connecting the operating device for a motor vehicle in the manner herein shown, and I do not believe that the so called hansom cab body with its rear elevated seat has ever been applied to the under frame construction of an automobile.

Having described my invention, what I claim as new and desire to secure by Letters Patent is:

1. A motor vehicle comprising an under frame construction, a cab body mounted thereon, a rearward extension upon said cab body, a platform at the upper side thereof, an elevated seat supported on said platform, means within easy reach of said seat for controlling the operative parts and the brakes on said vehicle, the connections between said means and said under frame construction for controlling said operative parts being housed within said extension.

2. A motor vehicle comprising an under frame construction, a cab body mounted thereon, a rearward extension upon said cab body, a platform at the upper side of said extension, means for controlling the transmission gearing mounted in the upper side of said extension adjacent said platform and within easy reach of the driver, said means being inclosed within said extension down to the under frame construction, and passing thence to the transmission gearing along said construction.

3. A motor vehicle comprising an under frame construction, a cab body mounted thereon, a rearward extension on said cab body, a platform at the upper side of said extension, an elevated seat supported from said extension, a plurality of shafts positioned in said extension adjacent the said platform, and having levers extending upwardly within easy reach of said seat, and rods passing downwardly and connected with actuating rocker arms and rock shafts, whereby the manipulation of said levers produces the desired effect in the operation of said vehicle.

4. A motor vehicle comprising an under frame construction, a cab body mounted thereon, an extension to the rearward of said cab body, a lofty seat rising from and supported upon said extension, a lever within easy reach of said seat, a horizontal shaft adjacent the upper side of said extension upon which said lever is mounted, rocker arms provided on said shaft, vertical rods depending from said arms, said shaft, rocker arms and vertical rods being housed within said extension, a shaft mounted in said under frame construction, sleeves thereon, bell crank levers mounted upon said sleeves, said rods being connected respectively with an arm of said levers, a second set of rods connected respectively with the other arm of said levers and passing thence to the transmission gearing for controlling the same.

In testimony whereof I affix my signature in the presence of two witnesses.

WILLIAM J. MILLER.

Witnesses:
 GEO. W. RIGHTMIRE,
 A. RAGER.